(No Model.)

G. A. ANDERSON.
CROSS HEAD.

No. 555,296.  Patented Feb. 25, 1896.

Witnesses
J. Snagg Poole
Geo. M. Copenhaver.

Inventor
Gustaf A. Anderson.
By Attorney Herbert W. T. Jenner.

UNITED STATES PATENT OFFICE.

GUSTAF ARVID ANDERSON, OF WAYNESBOROUGH, PENNSYLVANIA, ASSIGNOR TO THE GEISER MANUFACTURING COMPANY, OF SAME PLACE.

CROSS-HEAD.

SPECIFICATION forming part of Letters Patent No. 555,296, dated February 25, 1896.

Application filed August 13, 1895. Serial No. 559,154. (No model.)

*To all whom it may concern:*

Be it known that I, GUSTAF ARVID ANDERSON, a subject of the King of Sweden and Norway, residing at Waynesborough, in the county of Franklin and State of Pennsylvania, have invented certain new and useful Improvements in Cross-Heads; and I do hereby declare the following to be a full, clear, and exact description of the invention, such as will enable others skilled in the art to which it appertains to make and use the same.

This invention relates to cross-heads for steam-engines and other machinery in which cross-heads are used; and it consists in the novel construction and combination of the parts hereinafter fully described and claimed.

Figure 1:
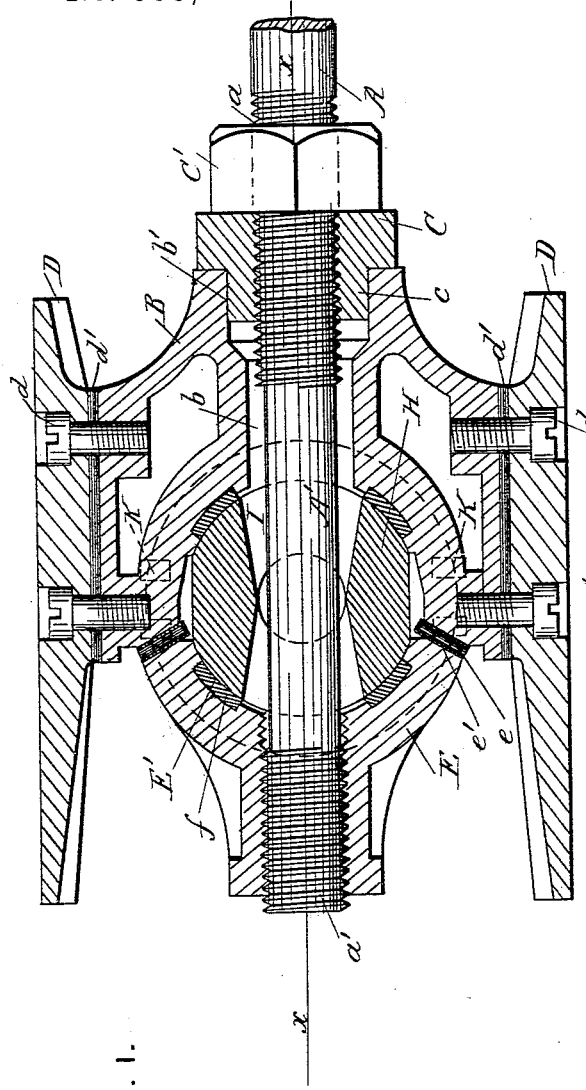
Figure 2:
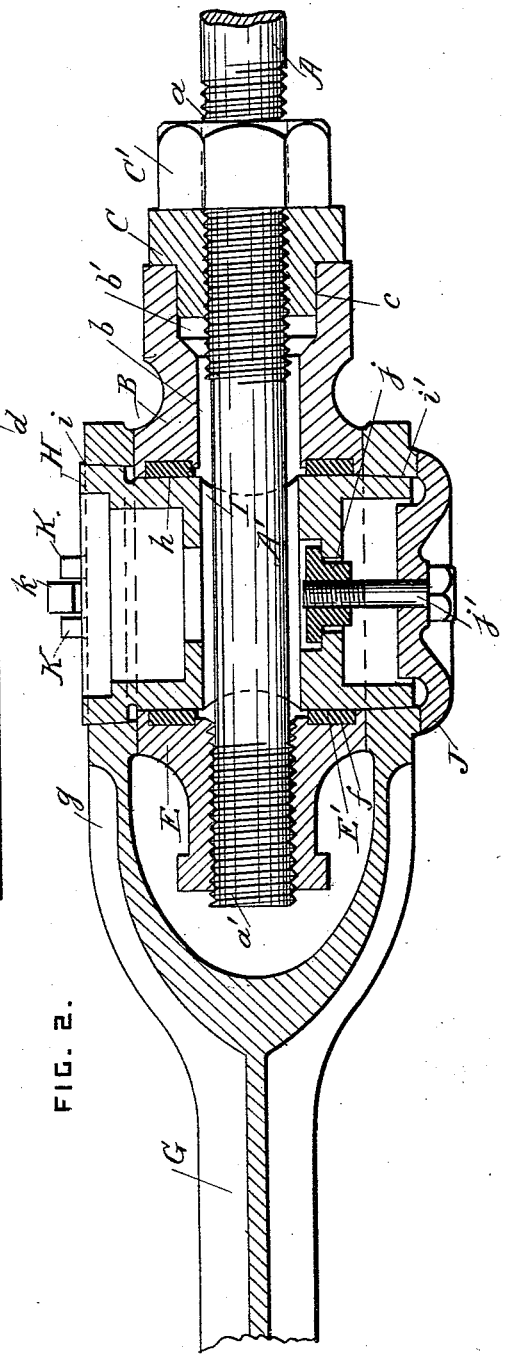

In the drawings, Figure 1 is a longitudinal section through the cross-head. Fig. 2 is a plan view taken in section on the line $x\ x$ in Fig. 1.

A is the piston-rod of the engine, which is provided with two screw-threaded portions $a$ and $a'$ on its front end, formed by cutting a continuous screw-thread on the end of the rod and cutting away the screw-threads at the part A'.

B is the main portion of the cross-head provided with a longitudinal hole $b$ and a recess $b'$ for the rod A to pass through.

C is a nut screwed upon the portion $a$ of the rod A and provided with a guide portion $c$, which turns in the recess $b'$.

C' is a jam-nut on the rod A behind the nut C.

D are shoes secured to the portion B of the cross-head and sliding in the cross-head guides, which are of any approved construction and are not shown in the drawings. These shoes may be formed integral with the portion B; but they are preferably secured to it by screws $d$, so that they may be adjusted. Liners $d'$ of thin sheets of metal are interposed between the parts B and D to compensate for wear. The shoes D may be turned concentric with the piston-rod, or they may be flat, as ordinarily constructed.

E is the cross-head cap which is screwed upon the screw-threaded portion $a'$ on the extreme end of the piston-rod. Liners $e$ are inclosed in thin copper covers $e'$ and are interposed between the meeting parts of the cap E and the main portion B. When the bearing of the cross-head wears, one or more of the thin liners $e$ is taken out, and the nut C is turned so as to draw the two parts of the cross-head closer together. The covers $e'$ facilitate the introduction and removal of the liners and are flattened when the parts of the cross-head are tightened up. The bearing E' of the cross-head is formed partly in the main portion and partly in the cap. It is cylindrical in form and is provided with strips of Babbitt metal $f$. These strips extend across the bearing except on the plane of the piston-rod, where they are short strips, as shown in Fig. 2.

G is the rear portion of the connecting-rod provided with a forked end $g$, which engages with the cross-head.

H is the cross-head pin, which is hollow and has a cylindrical portion $h$ which is journaled in the bearing of the cross-head. The said portion $h$ is preferably chilled or case-hardened. The ends $i$ and $i'$ of the pin H are turned of the same taper and fit in the eyes of the forked end of the connecting-rod. The pin H is provided with a lateral hole I for the piston-rod to pass through, and the hole I is as much larger than the piston-rod as will permit the pin H to have its necessary rocking motion without striking the piston-rod.

J is a plate which fits over the smaller end of the pin H and bears against the connecting-rod eye. A nut $j$ is let into a recess in the pin H in front of the piston-rod, and a pin $j'$ passes through a hole in the plate J and is screwed into the nut $j$. The tapered portions of the pin H are drawn up tight in the tapered holes of the forked end of the connecting-rod by turning the pin $j'$.

K are guide-lugs on the eyes of the connecting-rod, and $k$ is a lug on the larger end of the pin H. The lug $k$ engages loosely with the lugs K and insures the hole I being placed in line with the piston-rod.

What I claim is—

1. The combination, with a cross-head, a hollow pin journaled therein and provided with tapering end portions and a lateral hole for the piston-rod to pass through, and a connecting-rod provided with a forked end engaging with the tapering end portions of the pin; of a plate bearing against the connecting-rod over the smaller end of the pin, a nut let into the said pin in front of its said lateral hole, and a pin passing through a hole in the said plate and screwed into the said nut, substantially as set forth.

2. The combination, with a cross-head, a pin journaled therein and provided with a lateral hole for the piston-rod to pass through, and a connecting-rod provided with a forked end engaging with the end portions of the said pin; of interlocking guide-lugs on the end of the pin and on the eye of the connecting-rod adjacent thereto, whereby the alignment of the said hole with the piston-rod is assured, substantially as set forth.

3. The combination, with the main portion of a cross-head, a cap, and a cross-head pin journaled in the said main portion and cap; of thin liners, and covers of soft material inclosing the said liners and interposed between the said cap and main portion, and means for drawing together the said cap and main portion, substantially as set forth.

In testimony whereof I affix my signature in presence of two witnesses.

GUSTAF ARVID ANDERSON.

Witnesses:
 DANIEL S. BEARD,
 E. D. FAHRNEY.